United States Patent [19]

Crutcher

[11] Patent Number: 4,546,322
[45] Date of Patent: Oct. 8, 1985

[54] ADAPTABLE DEMODULATOR FOR ARBITRARY AMPLITUDE AND PHASE KEYED MODULATION SIGNALS

[75] Inventor: W. Larkin Crutcher, Richardson, Tex.

[73] Assignee: Reliance Electric Company, Cleveland, Ohio

[21] Appl. No.: 526,119

[22] Filed: Aug. 24, 1983

[51] Int. Cl.[4] .................... H04L 27/20; H04L 27/22
[52] U.S. Cl. ...................................... 329/50; 329/124;
329/135; 332/17; 332/19; 332/23 R; 375/42;
375/52; 375/67; 375/81; 375/83; 375/120
[58] Field of Search ................. 329/50, 122, 124, 135,
329/136; 332/16 R, 17, 19, 23 R, 9 R;
375/52-57, 42, 67, 81, 83-87, 94, 120

[56] References Cited

U.S. PATENT DOCUMENTS

| | | | |
|---|---|---|---|
| 3,970,946 | 7/1976 | Matsuo | 329/104 |
| 4,069,462 | 1/1978 | Dunn | 331/11 |
| 4,404,530 | 9/1983 | Stryer | 331/11 X |
| 4,404,532 | 9/1983 | Welti | 329/124 X |

FOREIGN PATENT DOCUMENTS 1395804  5/1975  United Kingdom .

OTHER PUBLICATIONS

Franks, "Carrier and Bit Synchronization in Data Communication—A Tutorial Review", IEEE Transactions on Communications, vol. COM-28, No. 8, Aug. 1980, pp. 1107-1121.

Matsuo et al., "Carrier Recovery Systems for Arbitrarily Mapped APK Signals", IEEE Transactions on Communications, vol. COM-30, No. 10, Oct. 1982, pp. 2385-2390.

Oetting, "A Comparison of Modulation Techniques for Digital Radio", IEEE Transactions on Communications, vol. COM-27, No. 12, Dec. 1979, pp. 1752-1762.

*Primary Examiner*—Siegfried H. Grimm
*Attorney, Agent, or Firm*—Michael M. Rickin

[57] ABSTRACT

A demodulator for demodulating a received signal which has been modulated in accordance with a modulation scheme which falls within the class of APK modulation. The demodulator uses a phase locked loop (PLL) to recover the carrier. A ROM in the demodulator provides information in both the sweep and locked modes of operation of the PLL to control the PLL. The ROM also provides at its output the digital data which has been encoded at the modulator in accordance with the selected APK scheme. The information stored in the ROM is uniquely determined by the signal points associated with the selected scheme. A modulator for generating the modulated signal received by the demodulator is also disclosed.

27 Claims, 6 Drawing Figures

ADAPTABLE DEMODULATOR FOR ARBITRARY AMPLITUDE AND PHASE KEYED MODULATION SIGNALS

BACKGROUND OF THE INVENTION

1. Field of the Invention

This invention pertains to a demodulator and more particularly to a demodulator which is adaptable for demodulating any signal which has been modulated in amplitude and/or phase by a grouping of conventional or arbritrary signal points.

2. Description of the Prior Art

Increasingly data in the form of a digital signal is transmitted by using it to effect modulation of a carrier signal. The particular type of modulation may follow anyone of a number of well known and conventional modulation schemes, such as phase shift keying (PSK) or quadrature amplitude modulation (QAM). All of these conventional schemes may be considered to be within the class of modulation schemes referred to as amplitude and phase keyed (APK). In addition there are a multiplicity of unconventional APK modulation schemes. Common to all such APK modulation schemes is the generation and transmission at the modulator of an analog signal whose amplitude and phase at any instant is uniquely representative of a predetermined number of data bits. The analog signal has an unique number of such amplitudes and phases which number is dependent solely on the particular modulation scheme being used. A further discussion of various APK modulation schemes may be obtained by referring to the following papers (1) "A Comparison of Modulation Techniques for Digital Radio", John D. Oetting, IEEE Transactions on Communications, Vol. COM-27, No. 12, December 1979 and (2) "Carrier and Bit Synchronization in Data Communication—A Tutorial Review", L. E. Franks, IEEE Transactions on Communication, Vol. COM-28, No. 8, August 1980.

Today such APK modulated signals find their principal application in microwave carrier systems. Such systems are associated with digital radio, land lines and cable networks. As is well known in the art such systems include modems at each end station wherein information to be transmitted is encoded in a modulator in accordance with the selected APK modulation scheme and wherein information received is decoded in a demodulator in accordance with the selected scheme.

With the large number of conventional and unconventional APK modulation schemes it is desirable to have both a modulator and a demodulator which are easily adaptable for use with any one of the APK schemes that may be selected. There have been some attempts in the prior art to design such a demodulator. One such attempt is described in U.S. Pat. No. 3,970,946 which issued on July 20, 1976. The demodulator described therein uses for the purposes of demodulation a reference map which contains the unique number of amplitude and phase points associated with the particular APK modulation scheme being used.

One embodiment of a demodulator useful for demodulating 16-QAM modulation is shown in FIG. 4 of the patent. An embodiment of a demodulator useful for demodulating another kind of modulated signal is shown in FIG. 9. Each of the embodiments differ from each other and make extensive use of hardware in the form of logic circuits. In addition, each of the embodiments includes a control source which is used to generate signals for controlling operation of each demodulator in a manner such that the process of demodulation is carried out in a sequential manner. Finally, while the patent shows in FIG. 8 that read only memories (ROM's) may be substituted for some of the logic circuitry in the demodulator of FIG. 4 it is clear that the control source remains. Therefore, the demodulation process remains unaltered.

Another such attempt is that described in the paper entitled "Carrier Recovery Systems for Arbritrarily Mapped APK Signals" by Matsuo and Namiki and published in the IEEE Transactions on Communications, Vol. COM-30, No. 10, October 1982. The paper describes an arbitrary APK demodulator. A block diagram of the demodulator is shown in FIG. 2 and the essential carrier control circuit for use therein is shown in FIG. 3. The demodulator includes a coarse carrier recovery loop which is used when the demodulator operates in the capture or acquisition mode to recover the carrier associated with the transmitted signal. In that mode the demodulator uses a sub-constellation concept implemented in the form of hardware to control carrier recovery.

The demodulator includes a fine carrier recovery loop which is used when the demodulator operates in the steady state or locked mode after it has recovered the carrier. In that mode the demodulator uses a ROM look-up table to provide control for a feedback loop. Therefore the demodulator described in the above paper uses, dependent on its mode of operation, two separate and distinct carrier recovery loops. In addition as shown in Table I only certain of the control circuits are used in each loop. Thus, the demodulator described therein uses different circuit means and controls dependent on its mode of operation.

It is, however, desirable that a demodulator use the same circuit means and controls independent of its mode of operation. It is further desirable that such a demodulator be easily adaptable for use with any type of APK modulation scheme. It is additionally desirable that such a demodulator include therein a multiplicity of reference signal planes all of which are used in both the acquisition and steady state modes to capture and maintain lock on the carrier signal. It is also desirable that such a demodulator be designed in a manner such that real time, as opposed to sequential, processing be used in both the acquisition and steady state modes of operation. Until the present invention no such demodulator and matched modulator were known.

SUMMARY OF THE INVENTION

According to the present invention there is described a demodulator for demodulating binary data from a carrier signal which has been modulated in accordance with an APK modulation scheme. The scheme gives rise to a multiplicity of signals representative of the binary data.

The demodulator includes compensation means which responds to the received signal and a first control signal for compensating for slow variations in the amplitude of the received signals. A compensated signal is generated at the output of the compensator. The demodulator also includes an oscillator for generating a signal having a controllable phase and frequency, the oscillator responding to second demodulation control signals for controlling the phase and the frequency.

A storage means stores a multiplicty of addressable words each containing information. The information is uniquely determined by the multiplicity of signal points. When addressed the information provides at the output of the storage means a signal for compensating for fast amplitude variations, the second control signals and the data.

The demodulator operates in a first mode to capture the received signal and in a second mode once the received signal is captured for maintaining capture. In both modes the demodulator is responsive to the second demodulation control signals and it is those signals which control the mode of operation.

The demodulator further includes means which responds to the compensated signal to generate the first control signal and also for recovering the clock associated with the received signal. Finally the demodulator includes means which responds to the compensated signal, the oscillator means generated signal, the recovered clock and the signal for compensating for fast amplitude variations to generate a signal for addressing the addressable words. The particular word that is addressed at any one time is dependent on the received signal.

DESCRIPTION OF THE DRAWINGS

FIGS. 2a to 2d are pictorial representations of the contents of the ROM for 16-QAM modulation.

DESCRIPTION OF THE PREFERRED EMBODIMENT

Figure 1:
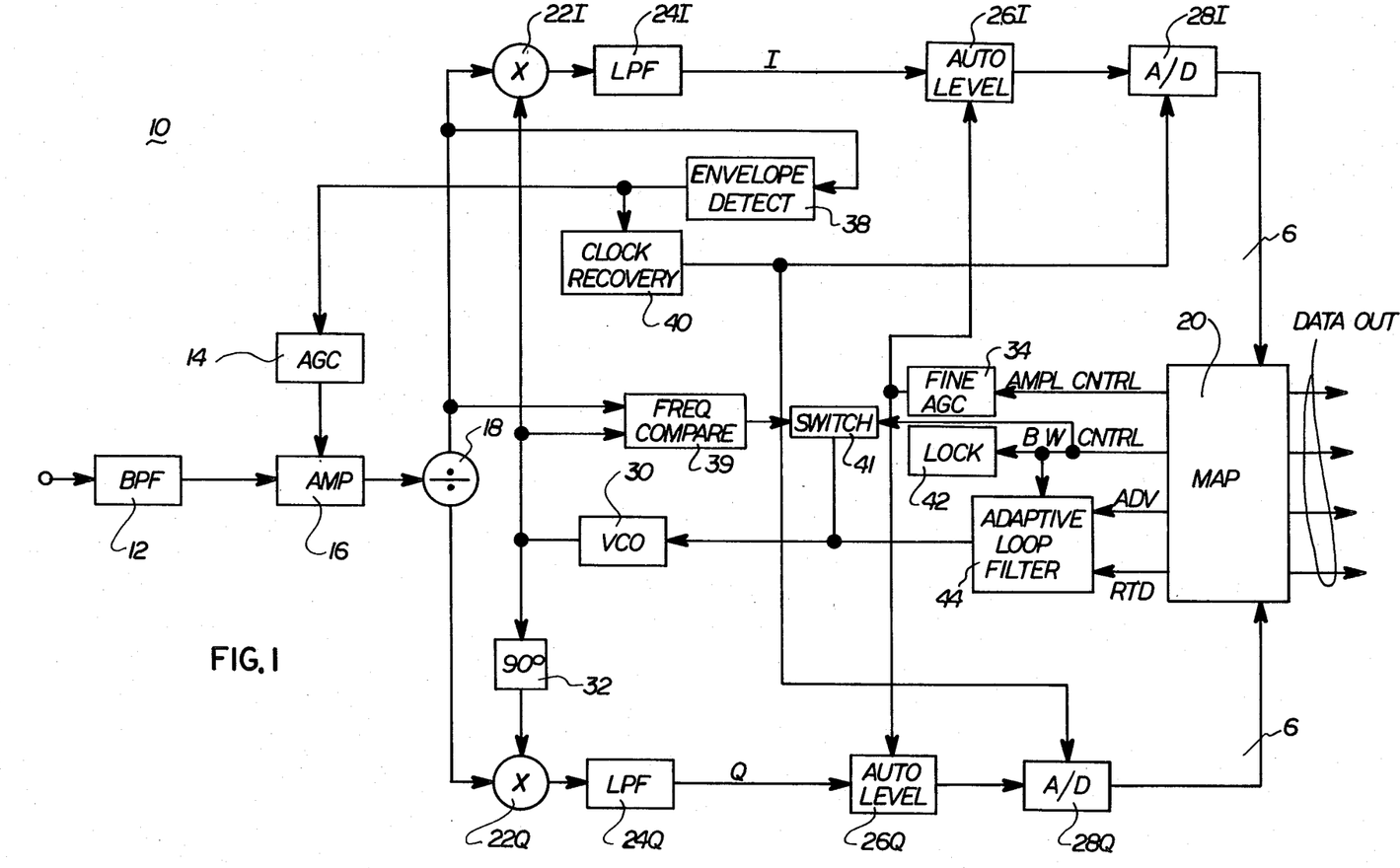
FIG. 1 is a block diagram of a demodulator embodied in accordance with the present invention.

Referring to FIG. 1 there is shown the block diagram of the demodulator 10 for use in the system of the present invention. While the demodulator may be used to demodulate any arbitrary APK modulated signal point set, its operation will be described in connection with a received signal which has been modulated in both amplitude and phase in accordance with 16-QAM modulation.

The signal received at the demodulator is first filtered by bandpass filter 12. This filtering eliminates any out-of-band noise and any possible interference from adjacent channels. The received signal amplitude will vary at a relatively rapid rate as a result of the amplitude modulation provided by the 16-QAM modulation. The amplitude of the received signal will also vary at a comparably slower rate. This relatively slow variation in amplitude may be due to various factors such as changes in the transmission media over or through which the signal has been transmitted. It is desirable to control, and thereby compensate for these slow variations in received signal amplitude. Such control which may be thought of as a coarse adjustment of amplitude, is provided by the combination of AGC circuit 14 and variable gain amplifier 16.

As will be described in more detail hereinafter, the AGC circuit receives an input signal from envelope detector 38. The AGC circuit in turn provides an input signal in the form of a d.c. voltage to amplifier 16. This signal allows the amplifier to control and thereby compensate for those slow variations.

After the compensation provided by amplifier 16, the signal is then divided equally with respect to its power by two-way zero degree (0°) divider 18 so as to provide two channels. These two channels are designated in FIG. 1 as the I (inphase) and Q (quadrature) channels respectively. Each channel is made up of the series combination of a mixer, a low pass filter (LPF), an automatic level control circuit, and an A/D converter. The output from each channel is from its associated A/D converter and is in the form of a predetermined number of bits which are used to address read only memory (ROM) 20. As both channels are identical in structure, the same circuit elements in each channel are identified with the same designator. Those elements in the inphase channel will, however, also carry as part of their designator an "I" whereas those in the quadrature channel will also carry as part of their designator a "Q". In addition as both channels function in a substantially similar manner, the operation of the I channel shall be explained in detail. Only the differences in operation between the Q and I channels then need be explained.

The I channel signal from power splitter 18 is received at mixer 22I wherein it is mixed with a signal generated by voltage controlled oscillator (VCO) 30. The signal received at the demodulator is of the double sideband type. It is, therefore, necessary to recover the carrier at the demodulator using a phase locked loop (PLL). The PLL, which is made up of substantially all of the circuit elements present in demodulator 10, controls the frequency (phase) of the VCO in a manner to be described hereinafter so as to effect recovery of the carrier frequency. Initially, the PLL operates in a sweep mode which allows the VCO output signal to move rapidly over the entire range of possible frequencies (i.e. phases). Once the demodulator of the present invention finds a preferred phase the PLL enters its locked mode. In that mode the speed of variation of the phase of the VCO output signal is substantially slower than its speed of variation in the sweep mode. With no input signal present at the demodulator, the VCO may either be at some quiescent frequency or may wander in fequency due to noise.

The Q channel signal from the power splitter is also mixed with the signal provided by the VCO. The only difference between the mixing of the I and Q channels signals is that the signal generated by the VCO is phase shifted 90° before it is mixed with the Q channel signal. The 90° phase shift is provided by shifter 32. It is this phase shift which allows the signal received by the demodulator to be divided into I and Q components.

The signal resulting from the mixing of the I channel signal with the signal generated by the VCO is then passed through low pass filter (LPF) 24I. The LPF eliminates the high frequency components which arise as a result of the mixing to thereby provide at its output the band limited I channel baseband signal. That signal is then one input to an automatic level control circuit 26I which functions in a manner similar to that previously described for amplifier 16. The output of circuit 26I is connected to A/D converter 28I. As will be described in more detail hereinafter the A/D converter converts the signal from the automatic level control circuit into a predetermined number of bits which are used to address ROM 20.

The level control circuit automatically adjusts the level of the signal at its output so that the converter always operates over its full range. Level control circuit 26I also has an input connected to the output of fine AGC circuit 34. That circuit in turn has its input connected to one of the outputs of ROM 20. That output in the form of a single line is designated as "AMPL CNTRL" in FIG. 1. The ROM provides on that output a single bit which may be either of two possible levels. Circuit 34 which functions in a manner similar to that described for AGC circuit 14, averages that bit over a number of bit intervals to thereby cause level control circuit 26I to adjust the amplitude of the signal into the A/D converter. The control provided by circuit 34 may be thought of as a fine adjustment of amplitude. One of the two possible levels for the bit is an indicator that the amplitude should be increased. The other of the two possible levels is an indicator that the amplitude should be decreased.

An envelope detector 38 has its input connected to the I channel output of the power divider 18. The envelope detector detects changes in the envelope of the I baseband signal with time. The output of the detector is connected to both the AGC circuit and to a clock recovery PLL 40. As changes in the amplitude of the I channel baseband signal occur at those times which correspond to the occurrence of the clock used in the modulator, then the detector and the PLL 40 function in combination to recover the clock signal. The output signal from the PLL 40 is therefore the recovered clock signal which is in turn connected as another input to the I and Q channel A/D converters 28I and 28Q.

Demodulator 10 also includes as previously mentioned, a ROM 20 which has stored therein a multiplicity of data words. Each word is made up of a multiple number of bits. The pattern of the bits contained in each word is dependent upon the particular modulation scheme being used. The data contained in corresponding groups of one or more bits of each word form a "reference constellation" map. In accordance with the present invention, ROM 20 includes data sufficient to form five such maps. Each map provides a particular piece of reference information which is used to control the demodulation process. The particular reference information provided by each map is a function at any instant of the signal received at the demodulator. Thus, the demodulator of the present invention uses five such pieces of reference information to control the demodulation of the received signal.

In one such embodiment for 16-QAM modulation, the ROM has stored therein 4,096 eight (8) bit data words. Four (4) bits of the eight bits in each word are the four bits which were encoded by the 16-QAM modulation at the modulator. These four bits which range from 0000 to 1111 appear at the outputs of the ROM designated as "DATA OUT" in FIG. 1. The demodulator therefore recovers the digital signal which was encoded at the modulator by addressing various locations in the ROM. As described above the particular location which is addressed in the ROM at any given time is dependent on the bit word present at the output of the I and Q channel A/D converters 28I and 28Q. Also as described above that address is dependent on the amplitude of the received signal at that instant. For the ROM described above 12 bits are needed to address any word and each of converters 28I and 28Q provide six (6) bits at their outputs. Thus the amplitude of the received signal in combination with the recovered clock and carrier allows the word in the ROM wherein the four bits that were encoded at the modulator are stored to be addressed and therefore recovered.

Each data word in the ROM also contains four (4) additional bits. Three of those bits are used to control the carrier recovery. The other one of those bits appears on the AMPL CNTRL output of the ROM and as has been described previously is used to control the operation of fine AGC circuit 34. As described above, the carrier recovery PLL operates in a sweep mode. When the phase of the VCO becomes identical to any one of a predetermined number of preferred phases, it is desirable to cause the carrier recovery PLL to switch its mode of operation to the locked mode.

Each word stored in the ROM includes a single bit which has one of two possible levels (either "0" or "1") when the carrier recovery PLL operates in the sweep mode and the other level when the PLL has captured one of the preferred phases. Therefore, when the phase of the VCO becomes substantially identical to any one of the preferred phases the word addressed in ROM includes a single bit of the proper level to cause the PLL to enter its locked mode of operation. That single bit appears on the ROM output designated as "BW CNTRL" in FIG. 1.

The BW CNTRL output of the ROM is received both by lock indicator circuit 42 and adaptive loop filter 44. When the bit has that level which is indicative of the capture of any one of the preferred phases by the VCO, circuit 42 responds thereto to provide an indication of that capture in some suitably acceptable form. Circuit 42 may also provide an output signal which may be used to enable the transfer of the data bits present on the DATA OUT lines. Until such time as one of the preferred phases is captured the data on those lines is invalid. The adaptive loop filter controls the bandwidth over which the carrier recovery PLL operates. It is embodied in the form of an active low pass filter which has a wide bandwidth to allow the PLL to operate in the sweep or acquisition mode and a narrow bandwidth when it is desired that the PLL operate in the locked or captured mode.

Prior to the capture by the VCO of one of the preferred phases it is necessary that the frequency of the VCO be locked to the carrier frequency of the received signal. Demodulator 10 includes frequency comparator and filter circuit 39 and switch 41 to accomplish that result. Circuit 39 has two inputs one of which is connected to receive the output of the VCO and the other of which is connected to one of the two outputs of the power divider 18. Circuit 39 therefore compares the frequency of the VCO output signal to the frequency of the received signal. As the received signal is of the double sideband type, circuit 39 looks at the average center frequency of the received signal.

The output from circuit 39 is a d.c. signal, which is connected by switch 41 in a summing relationship with the output of filter 44. Circuit 39 also includes a low pass filter which removes spikes from the d.c. signal. Switch 41 is also connected to receive the BW CNTRL output of the ROM. When that bit has the level indicative of the capture of any one of the preferred phases it causes switch 41 to open to thereby disconnect circuit 39 from the input to VCO 30. Circuit 39 therefore provides a d.c. control signal which causes the frequency of the VCO to become equal to the carrier frequency of the received signal when the PLL operates in the sweep mode.

As will be described in more detail hereinafter in connection with FIG. 2b, there are four preferred phases and statistically one fourth of the time the received signal will have one of these preferred phases. Only when the frequency of the VCO becomes equal to the frequency of the received signal can the demodulator capture one of these four preferred phases. Therefore the frequency control provided by circuit 39 occurs in a relatively rapid manner.

Once the frequency of the VCO is made equal to the frequency of the received signal the demodulator can then begin capture of one of the preferred phases. When the VCO has captured one of the preferred phases the BW CNTRL bit goes to the level indicative of capture. As statistically the demodulator will receive a signal having one of the preferred phases one-fourth of the time it is desirable to keep the BW CNTRL bit at the level indicative of capture for four time intervals. This maintaining of the bit at that level may be accomplished by having a monostable multivibrator (not shown) connected to that output of the ROM. When a preferred phase is captured the monostable is triggered to provide the desired level for four time intervals. Each time the received signal is received with the preferred phase the monostable is once again triggered.

When the BW CNTRL signal attains that level indicative of phase capture it not only causes the bandwidth of filter 44 to be narrowed, it causes switch 41 to open. As one of the preferred phases has been captured it is no longer necessary to keep circuit 39 connected to the input of VCO 30. The PLL then operates in the locked or captured mode. Switch 41 and filter 44 are embodied in a manner such that switch 41 opens in time before filter 44 has had a chance to narrow its bandwidth in response to the BW CNTRL signal attaining the level indicative of phase capture.

As described above the BW CNTRL signal is maintained at the level indicative of capture for four time intervals when a preferred phase is first captured. As long as a preferred phase occurs in the received signal before the BW CNTRL signal times out, the BW CNTRL signal will be maintained at the level indicative of capture. If the preferred phase does not occur again in the received signal before the BW CNTRL signal times out, then the BW CNTRL bit will revert to the level indicative of a noncapture of one of the preferred phases. In that case, the filter bandwidth will return to the bandwidth associated with the operation of the PLL in the sweep mode. Switch 41 will be caused to close and circuit 39 will once again be reconnected to the input of the VCO. The VCO will then operate in the sweep mode until such time as the BW CNTRL bit once again has the level indicative of the capture of one of the preferred phases.

Therefore, the PLL of demodulator 10 operates in a sweep mode wherein firstly the frequency of the VCO is made equal to the frequency of the received signal and then secondly one of the preferred phases is captured. Once a preferred phase is captured the PLL is then caused to operate in the locked mode. Circuit 39 may be embodied by any one of a number of currently available frequency/phase comparator integrated circuits. Switch 41 may be embodied in the form of a transistor wherein the BW CNTRL signal is connected in a manner so as to cause the transistor to be either conductive or nonconductive as the case may be.

Finally each word in the ROM includes two (2) bits which are used to keep the VCO aligned in phase with one of the preferred phases it has captured during its sweep mode of operation. These two bits appear on the ROM output lines designated as "ADV" (advance) and "RTD" (retard) in FIG. 1 and are received as inputs to the adaptive loop filter. Depending upon the levels associated with these bits, the filter will cause the VCO to slowly either advance or retard its phase so as to maintain its lock on the captured phase. Therefore the ADV and RTD bits are control voltages which cause the cutoff frequency of the active low pass filter to be changed from one to the other of two possible such frequencies. The ADV and RTD bits also control the phase of the VCO during its sweep mode of operation. Thus, demodulator 10 uses a ROM which includes therein data sufficient to form five reference maps which are used to control the demodulation of the signal received by the demodulator.

Figure 2A:
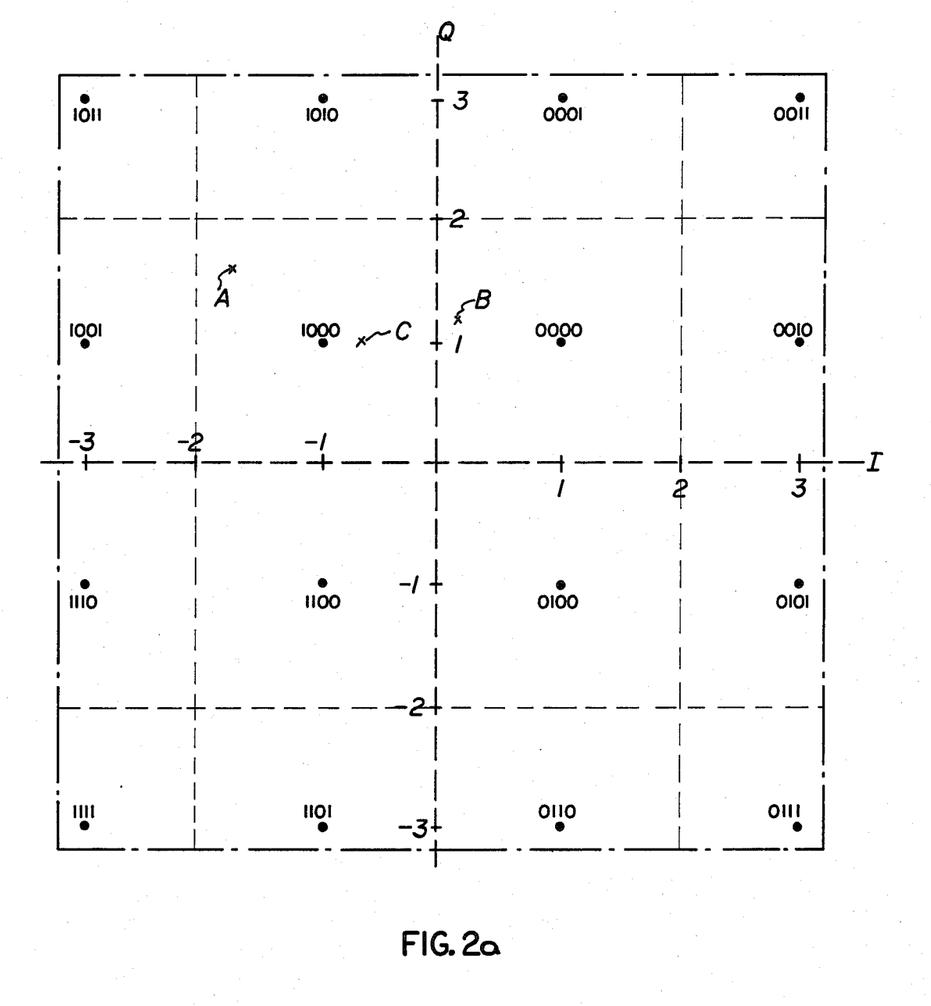
FIG. 2a shows the data map.

Referring to FIGS. 2a, b, c and d, there are shown pictorial representations for the five reference maps contained in ROM 20. FIG. 2a shows the reference map for the four bits of each ROM word which appear on the four DATA OUT outputs of the ROM. FIG. 2b shows the reference map for the single bit of each ROM word which appears on the BW CNTRL output of the ROM. For ease of illustration and explanation, it has been decided to combine into a single map the two maps which provide advance and retard signals to the adaptive loop filter 44. Therefore, FIG. 2c shows the combined reference map for the two bits of each ROM word which appear on the ADV and RTD outputs of the ROM. Finally, FIG. 2d shows the reference map for the single bit which appears on the AMPL CNTRL output of the ROM. The pictorial representations of FIGS. 2a to 2d when taken in combination provide a pictorial representation of the entire contents of the ROM.

Each of the pictorial representations are drawn on an orthogonal coordinate system wherein the x-axis is labeled I (inphase) and the y-axis is labeled Q (quadrature). As previously mentioned the ROM contains 4,096 eight (8) bit words. As the square root of 4,096 is 64, the contents of the ROM may be pictorially represented by a reference map in which the I and Q axes are each divided into 64 steps. Therefore, there are 4096 points which are uniquely defined by the 64 steps on the I and Q axes.

The pictorial representations of FIGS. 2a to 2d each have their I and Q axes divided into 64 steps. The numbers 1, 2 and 3 have been placed along the positive and negative portions of each axis. Each number represents an increment of ten such steps from the adjacent number. Therefore, each of the maps of FIGS. 2a to 2d uniquely identifies in a pictorial representation the 4,096 words which are stored in the ROM.

Referring to FIG. 2a, there is shown the pictorial representation of the reference map for the four bits of each ROM word which appear on the ROM's four DATA OUT outputs. As described in connection with FIG. 1, there appears at the outputs of the A/D converters 28I, 28Q, a bit word. That bit word is used to address a particular location in the ROM. The location being addressed is dependent on the amplitude of the signal received at the demodulator at that instant. The received signal has been encoded by the 16-QAM modulation scheme at the associated modulator. In accordance with that type of modulation, each group of four bits to be transmitted is assigned at the modulator, a particular one of 3 possible unique amplitudes and a particular one of 12 possible unique phases. In total the four bits to be transmitted are assigned a particular one of 16 possible unique combinations of amplitude and phase. These 16 combinations form a set of points.

The point set that is transmitted in accordance with 16-QAM modulation is shown in FIGS. 2a to 2d by the 16 state or signal points which are represented in the form of dots. The amplitude and phase that is assigned to each point at the transmitter may readily be determined by connecting any such dot to the origin of the I, Q axes. This connection gives rise to a vector whose magnitude and phase angle with respect to the positive I axis are a function of the amplitude and phase assigned to that point at the transmitter. Adjacent to each point is the corresponding four bit group which that point represents. Therefore, each four bit group is transmitted from the modulator as a unique combination of amplitude and phase.

As a result of circumstances associated with its transmission from the modulator, the signal received at the demodulator at any instant of time will most likely not have an amplitude and phase which is exactly equal to one of the 16 unique state points. The output of the demodulator (which appears on the DATA OUT output lines of the ROM) must, however, at any instant be only one of the 16 possible four bit groups. Therefore, it is desirable that received signal amplitudes falling within certain predetermined limits give rise to the same group of four bits on the DATA OUT lines. The map of FIG. 2a shows these limits for the point set associated with 16-QAM modulation.

An illustrative example which shows the interrelationship of the DATA OUT or amplitude map of FIG. 2a with the signal amplitude received at the demodulator will now be described. Assume the signal received at the demodulator has the I and Q channel coordinates (i.e. amplitudes) which are associated with the point designated as "A" in FIG. 2a. The coordinates of point A are I equals $-1.8$ and Q equals 1.6, i.e. ($-1.8$, 1.6). It is clear that point A is not identical to any of the 16 state points shown in FIG. 2a which are associated with the unique amplitudes assigned at the modulator. Yet when transmitted from the modulator, the point A signal was one of those 16 unique state points. In fact, the point A signals fall in the fourth quadrant of the amplitude map and, therefore, it is more likely associated with one of the four state points (1000, 1001, 1010, 1011) which lie in that quadrant.

As shown in FIG. 2a, the amplitude reference map has been divided into 16 regions, each associated with a respective one of the 16 state points. The regions are defined by six (6) boundaries, of which two (2) are the I and Q axes. The boundaries of each region are the lines formed by all of the points which are equidistant between the state point associated with the region and the adjacent state points. Point A falls within the region bounded by $+2$ on the Q axis, $-2$ on the I axis and the origin of the coordinate system. As the I and Q axes are divided into 64 steps this region contains therein 400 words of the ROM. Therefore point A is uniquely associated with one of those 400 words.

For ease of description each of the 16 regions shown in FIG. 2a will be referred to hereinafter by the four DATA OUT bits contained therein. Therefore point A lies within the 1000 region. It is this region which defines the predetermined limits on received signal amplitude for all such amplitudes associated with the 1000 point. As point A lies within the 1000 region, the four DATA OUT bits of the unique ROM word associated therewith contain the binary digits 1000. In fact, any received signal whose I and Q channel amplitudes falls within the above region, causes a location to be addressed in ROM whose associated word contains the four DATA OUT bits 1000.

In a similar manner each of the other 15 regions shown in FIG. 2a define a predetermined number of words in the ROM each of whose DATA OUT bits contain the four bits associated with that region. The predetermined number of words defined by each region are:

| Region | Number of Words |
|--------|-----------------|
| 0000   | 400             |
| 0001   | 240             |
| 0010   | 240             |
| 0011   | 144             |
| 0100   | 400             |
| 0101   | 240             |
| 0110   | 240             |
| 0111   | 144             |
| 1000   | 400             |
| 1001   | 240             |
| 1010   | 240             |
| 1011   | 144             |
| 1100   | 400             |
| 1101   | 240             |
| 1110   | 240             |
| 1111   | 144             |

In total the 16 regions define the 4096 words contained in the ROM. Thus the amplitude and phase of the signal received at the demodulator determines the particular one of the 16 regions in which it lies. This in turn causes a unique location in ROM to be addressed. The word in that location contains the four DATA OUT bits uniquely associated with that region.

As described in connection with FIG. 1 each word stored in ROM contains a single bit (BW CNTRL) whose level controls the mode in which the PLL operates. Initially the PLL operates in the sweep mode in order that the demodulator may recover the carrier of the received signal. The signal transmitted from the associated modulator may have any one of 12 possible phases. As shown in FIG. 2a the four bits 0000 and 0011 when encoded at the modulator give rise to a transmitted signal whose phase is at 45° with respect to the positive I axis. Similarly the four bits 1000 and 1011; 1100 and 1111 and 0100 and 0111 give rise to transmitted signals whose phases are at 135°, 225°, and 315° respectively. The other eight four bit groups give rise to phases which are at ±18.43° with respect to the positive and negative I and Q axes. Therefore on a statistical basis one-half of all the signals transmitted from the demodulator have phases which are at ±45° with respect to the positive and negative I and Q axes.

It is desirable that the demodulator recover the carrier in an expeditious manner. As described in connection with FIG. 2a the signal received at the demodulator gives rise to four bits on the ROM's DATA OUT lines. These four bits should be the same as the four bits that were encoded at the modulator. Until such time as the PLL switches from the sweep mode to the captured mode the demodulator is not synchronized to the modulator. Therefore the various four bit combinations appearing on the DATA OUT lines during that time do not correspond to the four bits encoded at the modulator. They are and will remain invalid data until such time as the PLL switches to the captured mode. Thus it is desirable that the demodulator recover the carrier expeditiously.

As described above, one-half of all the transmitted signals will have phases which are at ±45° with respect to the I and Q axes. Therefore, on a statistical basis one-half of all the signals received at the demodulator should have phases which are either at or substantially close to ±45° with respect to the positive and negative I and Q axes. It appears then, that when the demodulator detects a received signal having such a phase, the PLL's should enter its locked mode of operation.

In addition, the same point set appears in all four quadrants. This gives rise to a four-fold ambiguity which causes the phase detection characteristic to have unstable lock points. It is for this reason that the bandwidth control map of FIG. 2b, to be described in more detail hereinafter, is used. The phases 45°, 135°, 225° and 315° (all with respect to the positive I axis) are therefore the preferred phases referred to in connection with FIG. 1. The demodulator uses the map to control the PLL such that it locks to one of the preferred phases to thereby remove the ambuiguity. Thus, when the demodulator receives a signal having a phase which is at or near one of the four preferred phases, the PLL should enter its locked mode of operation.

As previously described, there are two state points associated with each of the four preferred phases or eight points in total. These eight points may be divided into two groups of four points each. One of the two groups, referred to hereinafter as the "outermost", consists of the 0011, 1011, 1111 and 0111 points. The other of the two groups, referred to hereinafter as the "innermost" consists of the 0000, 1000, 1100 and 0100 points. The innermost group has the same amplitude and phase as the group of signal or state points associated with four-phase phase shift keying (PSK). It has been found that the state points for four-phase PSK does not have any undesired lock points. Therefore, if only the innermost group is used to control the entry of the PLL into the locked mode, the undesired lock points for 16-QAM modulation are eliminated. Thus, in the demodulator of the present invention the PLL will enter its locked mode only when the received signal has an amplitude and phase which fall within certain predetermined boundaries surrounding the innermost group of points.

In addition, it is desirable that the demodulator detect the capture of one of the preferred phases with a minimum of ambiguity. This minimum ambiguity of detection arises only with respect to the innermost group of state points. Referring once again to FIG. 2a, it can be seen that the 0000 and 0011 points both lie along the preferred phase of 45°. It also can be seen that while the 0000 point lies in the middle of its associated region, the 0011 point lies close to the upper right hand corner of its associated region. The phase of the received signal may be either above or below 45°.

As the 0000 state point lies in the center of its region the received signal may vary greatly in phase about 45° and yet still fall within the region. On the other hand, as the 0011 point lies close to one corner of its region it can not vary as greatly in phase before it falls outside of the region. Similar considerations apply to the differences in allowable phase variability associated with the state points that lie along the other three preferred phases. Therefore, the innermost group of state points allows a greater degree of phase variability as compared to the phase variability associated with the outermost group. Thus, the innermost group of points allow the greatest amount of variability in received phase and therefore allow the demodulator to capture one of the four preferred phases with a minimum of ambiguity.

In summary, only four of the 16 state points are used to cause the PLL to change from the sweeped mode to the captured mode. Therefore, the number of transmitted signals which fall within the preferred group of points is four. Thus, on a statistical basis one fourth of all signals received at the demodulator will have been transmitted from the modulator with one of the preferred phases. While the number of signals with the preferred phases has been reduced, any increase in time for the PLL to go into its locked mode as a result of that reduction is more than compensated for by the minimum ambiguity of detection and the lack of undesired lockpoints associated with the innermost group.

Figure 2B:
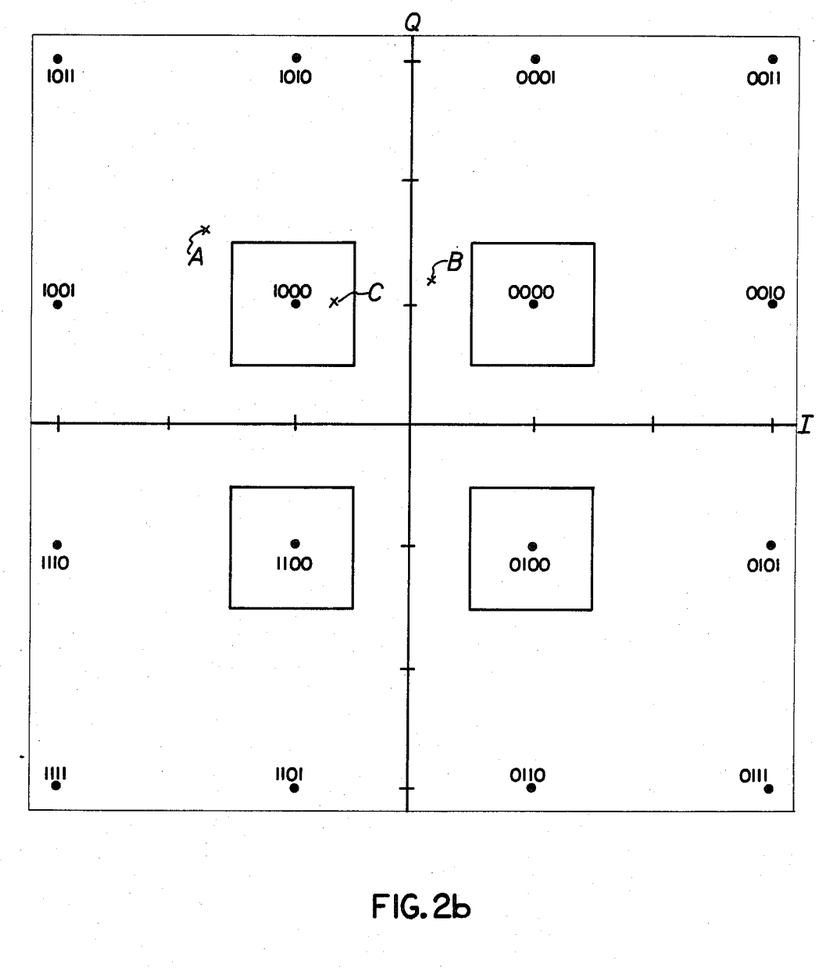
FIG. 2b shows the bandwidth control map.
Figure 2C:
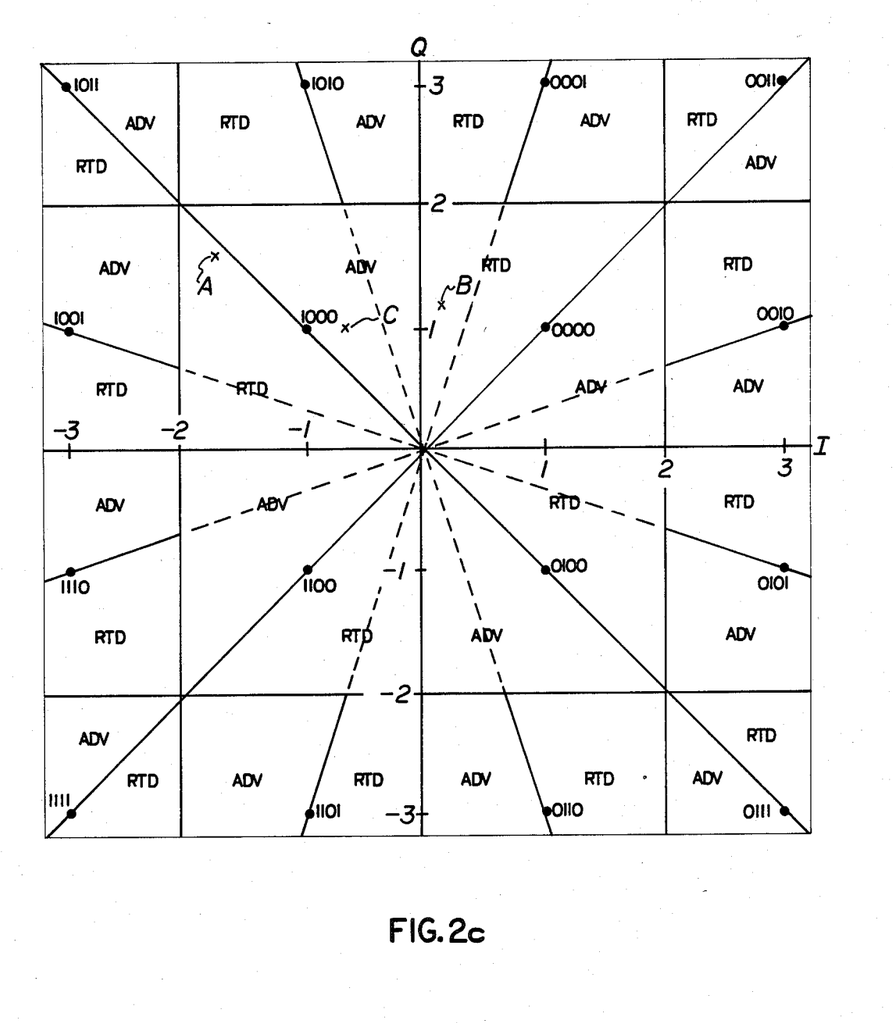
FIG. 2c shows the phase control map.
Figure 2D:
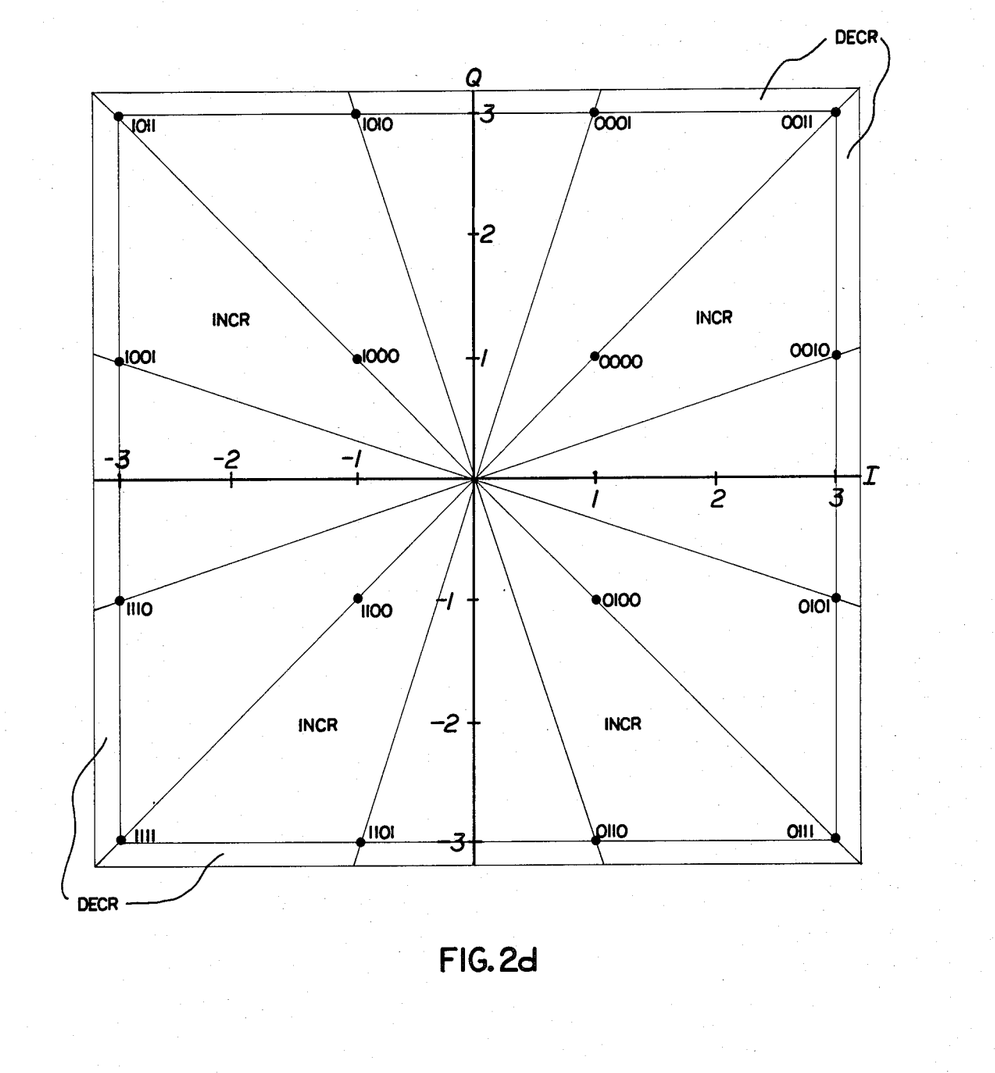
FIG. 2d shows the amplitude control map.

Referring now to FIG. 2b there is shown the pictorial representation for the reference map associated with the BW CNTRL bit. As can be seen from FIG. 2b there is drawn around the 0000, 1000, 1100 and 0100 points a square region which is smaller than the regions srrounding the innermost group of points in FIG. 2a. The boundaries of the regions of FIG. 2b are determined by the lines formed by the points which are equidistant from the associated innermost state point and the associated I and Q axes. In fact, the region surrounding each innermost group point in FIG. 2b encompasses 121 words. This is compared to the 400 words encompassed by the innermost regions of FIG. 2a. The regions of FIG. 2b will also be referred to by the group of four bits that they are associated with.

The regions of FIG. 2b are smaller than the associated regions of FIG. 2a in order to aid detection with minimum ambiguity. As can be seen from FIG. 2a the 0000 region is contiguous with 1000 and 0100 region. At the origin of the coordinates the 0000 region touches the 1100 region. If similar sized regions were used in the reference map of FIG. 2b then an ambiguity might result if the received signal gave rise to a phase which fell on or near the boundary between any two such regions. For example, if the received signal had an amplitude such that it gave rise to a point shown as B in FIG. 2a having the coordinates (+0.1, 1.2) it would be unclear if that signal should be said to have a phase associated with the 0000 point (45°) or with the 1000 point (135°). Therefore making the BW CNTRL regions of FIG. 2b smaller than the associated domains of FIG. 2a eliminates a possible source of ambiguity. As seen in FIG. 2b, point B lies outside any one of the preferred phases, even though its amplitude is associated with the 0000 point. Further allowing the regions of FIG. 2b to be sized as shown provides both a sufficient number of points surrounding each of the four preferred phases in combination with a sufficient number of points separating each of the regions from each other.

A few simple examples will now illustrate the means by which the demodulator uses the BW CNTRL map to capture one of the four preferred phases. Referring back to FIG. 2a there was described a point A having the coordinates (−1.8, 1.6). This point lies within the 1000 amplitude region. As seen in FIG. 2b, however, this point lies outside of the range of phases that are within the 1000 BW CNTRL region. Therefore, the PLL will not enter its locked mode of operation as a result of the demodulator receiving the signal represented by point A. In other words, the BW CNTRL bit of the ROM word associated with point A will not have the proper level to cause the PLL to enter its locked mode of operation.

Referring again to FIG. 2a there is shown a point C having the coordinates (−0.7, 1.0). This point also lies within the 1000 amplitude region. As shown in FIG. 2b this point C also lies within the range of phases in the 1000 BW CNTRL region surrounding the preferred phase. Therefore, the demodulation by demodulator 10 of a received signal which gives rise to point C will cause a bit to appear on the BW CNTRL output of the ROM which, in turn, has the proper level to cause the PLL to enter its locked mode of operation.

In fact, all of the ROM words falling within the 1000 region of FIG. 2b would have a BW CNTRL bit having the same level, which level would cause the PLL to enter the locked mode of operation. In addition, all of the ROM words falling within the 0000, 1100 and 0100 regions of FIG. 2b will also have BW CNTRL bits having the same level as the BW CNTRL bits inside the 1000 region. All of the words of ROM which fall outside of the BW CNTRL regions would have BW CNTRL bits of the opposite level. Thus a received signal which gives rise as a result of the mixing to a phase which falls within the regions of FIG. 2b ensures that the PLL will enter its locked mode of operation. If the phase which results from the mixing operation falls outside of the regions then the PLL will remain in its sweep mode of operation.

Once the PLL switches from its sweep mode to its locked mode of operation, it is desirable to keep the VCO aligned in phase with the one of the four preferred phases it has aligned itself to during its sweep mode of operation. Each word in ROM contains two bits, which dependent on their level, will cause the VCO to either slowly advance or retard its phase so as to maintain its lock on the captured phase. As described in connection with FIG. 1 these advance and retard bits appear on the ADV and RTD output lines, respectively of the ROM.

Referring now to FIG. 2c, there is shown the pictorial representation for the reference map in ROM associated with these phase advance and retard control bits. Each of the four quadrants of the map is divided into eight phase control regions. The boundaries of any phase control region is a combination of the amplitude threshold boundaries shown in FIG. 2a and the radius from the origin to a given state point. Either all or part of the radius may be used in forming a boundary. That part of any radius which is used in forming a boundary is shown by a solid line in FIG. 2c.

Each region is associated either with a phase advance or a phase retard. All points which lie clockwise of a radial line and within the threshold boundary for a given state point are used to advance the phase. All points which lie counterclockwise of a radial line and within the threshold boundary for a given state point are used to retard the phase. For ease of reference, a region is labeled as ADV if it controls a phase advance or RTD if it controls a phase retard. If the received signal falls within an ADV region, there is then contained in the bit which controls phase advancing the level which will cause the output of filter 44 to advance the phase of the VCO. For that signal there is contained in the bit which controls phase retarding, the level which will not cause the filter output to retard the phase of the VCO. For a received signal which falls within a RTD region, the opposite will be true.

A few simple examples using the A, B and C points shown in FIGS. 2a and 2b should be sufficient to illustrate the control provided by the reference map of FIG. 2c. Also in connection with these examples, it is assumed that when the ADV and RTD bits are a "1", then the associated phase control function is enabled and when they are an "0" the associated phase control function is disabled.

Point A falls within one of the four RTD regions of the fourth quadrant. Therefore, there is stored in the ROM word associated with that point a RTD bit which is a "1" and an ADV bit which is an "0". As a result of receiving the signal which gives rise to point A, the phase of the VCO is controlled by the output of filter 44 so as to be slowly retarded. A similar result occurs for point B as it also falls within an RTD region even though this region occurs in the first quadrant.

Point C falls within one of the four ADV regions of the fourth quadrant. Therefore, there is stored in the ROM word associated with that point an ADV bit which is a "1" and a RTD bit which is an "0". As a result of receiving the signal which gives rise to point C, the phase of the VCO is controlled by filter 44 so as to be slowly advanced. Thus, upon capture of the one of the preferred phases, the phase of the VCO is controlled so as to be maintained in alignment with the captured phase.

As described in connection with FIG. 1, there are A/D converters 28I, 28Q in the I and Q channels. The ROM provides a single bit (AMPL CNTRL) which is averaged by fine AGC circuit 34 to thereby cause the level control circuits 26I, 26Q to adjust the amplitude of the signal into the associated one of the A/D converters. The AMPL CNTRL may be either of two levels, one of which is an indicator that the amplitude should be increased and the other of which is an indicator that the amplitude should be decreased. As previously described, the purpose of adjusting the signal level appearing at the converters input is to ensure that the converter always operates over its full range.

Referring to FIG. 2d, there is shown the pictorial representation for the reference map in ROM associated with the AMPL CNTRL (fine amplitude control) bit. This map is divided into two regions which, for ease of description, have been designated as INCR (increase) and DECR (decrease), respectively. The INCR region encompasses all of the ROM words contained between ±3 on the I and Q axes. There are 3600 ROM words contained in the INCR region. Each one of these 3600 ROM words has an AMPL CNTRL bit which is of the proper level to indicate that the amplitude of the signal into converters 28I, 28Q should be increased.

The DECR region encompasses all of the remaining words of the ROM. These are 496 ROM words contained in the DECR region. Each of these 496 words has an AMPL CNTRL bit which is of the proper level to indicate that the amplitude of the signal into the converters should be decreased. Thus, the amplitude of the signal into the converters is controlled so as to ensure that the converters always operate over their full range.

Figure 3:
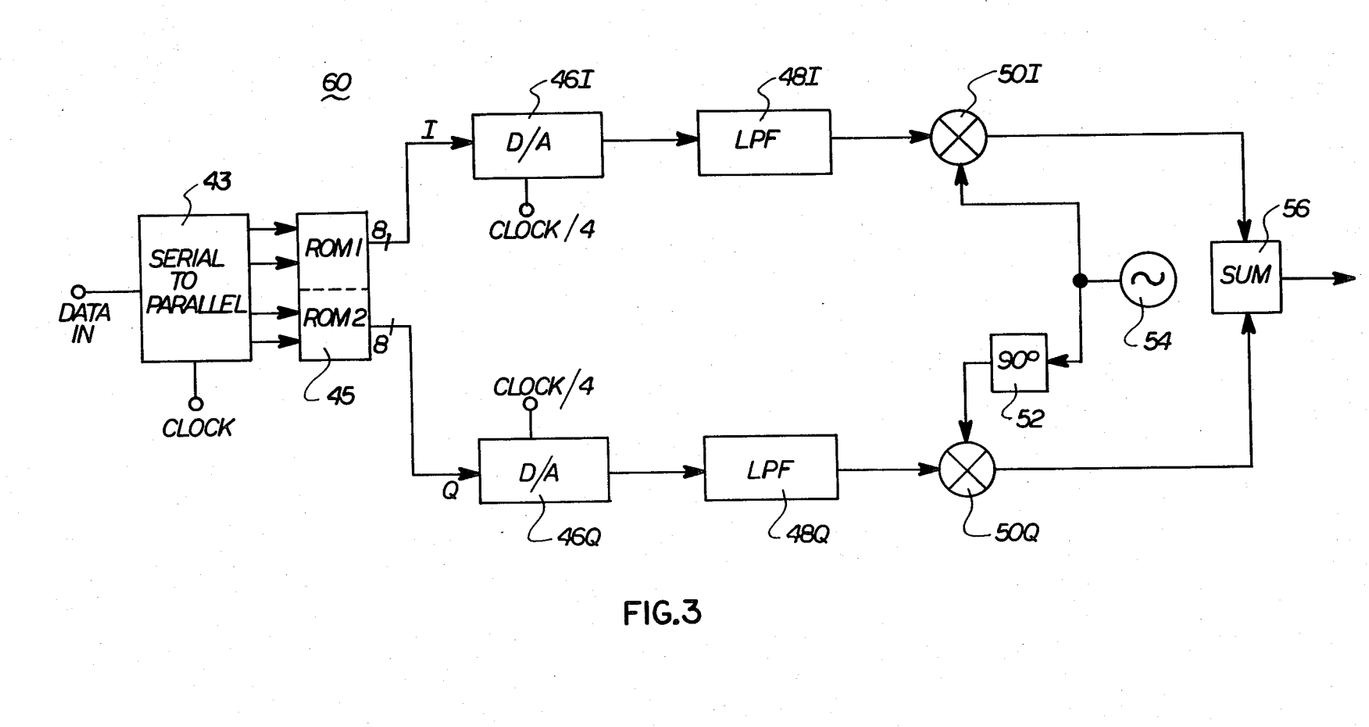
FIG. 3 shows a block diagram of a modulator embodied in accordance with the present invention.

Referring to FIG. 3, there is shown a block diagram for a modulator 60, which also uses a state space map in order to generate the modulated signal for transmission to the demodulator of FIG. 1. While the modulator may be used to modulate a carrier signal in accordance with any arbitrarily defined amplitude and phase keyed modulation scheme, its operation will be described in connection with 16-QAM modulation.

Referring momentarily to FIG. 2a, it is seen that the analog output signal from the modulator may have anyone of 16 possible combinations of amplitude and phase. The particular combination is determined solely by the four bit group present at the modulator input. Returning now to FIG. 3, the signal at the input to the serial to parallel converter 43 is in the form of a serial stream of bits. It should be appreciated that the serial bit stream may result from the prior conversion of an analog signal into a digital signal.

Converter 43 converts the serial bit stream into parallel groups of four bits each. These groups range from 0000 to 1111. The four bit groups are used to address locations in the memory circuit 45. Circuit 45 is made up of two ROM's, which for convenience have been labeled in FIG. 3 and will be referred to hereinafter as ROM 1 and ROM 2. Each of the two ROM's includes at least 16 eight bit words. The output of converter 43 is used to address one of the 16 words in each of ROM 1 and ROM 2. Each of the eight bit words are then processed by the remaining circuitry of modulator 60 in a manner, to be described hereinafter, such that the analog signal at the output of summing circuit 56 has one of the 16 possible combinations of amplitude and phases for 16-QAM modulation.

The series combination of a D/A converter, a low-pass filter (LPF) and a mixer are used to process the eight bit words that are the output from ROM 1 and ROM 2. There are two such series combinations, one of which is used to process the eight bit word out of ROM 1 and the other of which is used to process the eight bit word out of ROM 2. The series combination used to process the output from ROM 1 may be said to be equivalent to the I channel of the demodulator and therefore each of its circuit elements carry as part of their designator an I. The series combination used to process the output from ROM 2 may be said to be equivalent to the Q channel of the demodulator and therefore each of its circuit elements carry as part of their designator a Q. As both combinations are identical in structure, only the operation of the combination used to process the output of ROM 1 shall be explained in detail.

The eight bit word output from ROM 1 is converted by D/A converter 46I into an analog signal. That signal is then passed through LPF 48I which eliminates any high frequency components to thereby provide at its output a band limited baseband signal. The baseband signal is then mixed by mixer 50I with the carrier signal generated by oscillator 54. The signal at the output of the LPF 48 Q is also mixed at mixer 50Q with the carrier signal provided by oscillator 54. The only difference between the mixing at mixers 50I and 50Q is that the signal generated by the oscillator is phase shifted 90° before it is mixed with the output of LPF 48Q. The 90° phase shift is provided by phase shifter 52.

The signals at the outputs of the mixers 50I and 50Q are then summed together at summing circuit 56 to thereby generate a double sideband analog signal which has one of the 16 possible combinations of amplitude and phase. As described in connection with FIG. 2a each of the 16 combinations (state points) may be uniquely defined by its I and Q channel coordinates. Therefore the signals at the outputs of mixers 50I and 50Q are 90° out of phase with respect to each other and have amplitudes which are such that their ratios are the same as the ratios of the I and Q channel coordinates of the associated state point.

There has been described a demodulator 10 and a modulator 60 which utilize state space maps in the associated ROM's to demodulate and modulate a signal in accordance with 16-QAM modulation. It should be appreciated that the demodulator and the modulator circuits can also be used to demodulate and modulate a signal in accordance with any type of APK modulation, whether conventional or unconventional. It should further be appreciated that the demodulator and modulator circuits are usable in exactly the form as shown in FIGS. 1 and 3 for any type of APK modulation. The only change necessary for the demodulator and modulator to be usable for any type of APK modulation is that the state space maps in the ROM must be generated for that type of modulation. Therefore, in accordance with the present invention there has been described a demodulator and an associated modulator which may be easily adapted for use with any type of APK modulation.

In adapting the demodulator for use with a type of APK modulation different than 16-QAM it should be appreciated that the same group of maps described in connection with FIGS. 2a to 2d must be generated in the ROM. It should also be appreciated that the information contained in the ROM is uniquely determined by the signal or state points associated with the type of APK modulation being used. Therefore, for any type of APK modulation the ROM of the demodulator must contain information sufficient to give rise to a data (DATA OUT) map, a carrier recovery control (BW CNTRL) map, a phase control (ADV/RTD) map and a fine amplitude control (AMPL CNTRL) map. The principles guiding the generation of each such map for any type of APK modulation are exactly the same as those described in connection with the maps of FIGS. 2a to 2d for 16-QAM modulation.

In summary, these principles are:

1. Data map (DATA OUT)—This map is always divided into a number of regions equal to the number of state points associated with the type of APK modulation being used. The boundaries of each region are the lines formed by all of the points which are equidistant between the state point associated with the region and the adjacent state points.

2. Carrier recovery (bandwidth) control map (BW CNTRL)—This map is determined by selecting those state points which allow the greatest variability in received phase. For those types of APK modulation such as QAM wherein the amplitude as well as the phase is varied, the selected state points are usually those of the innermost group. For those types of APK modulations such as PSK wherein the amplitude is held constant there is no innermost group but the state points still follow the criterion set forth above.

The boundary surrounding each selected state point is selected to dictate a minimum acceptable bit error rate performance during acquisition of the carrier.

3. Phase control map (ADV/RTD)—This map is always divided into a number of phase advance and phase retard regions which are each equal to the total number of state points associated with the type of APK modulation being used. In other words, there is associated with each state point a phase advance region and a phase retard region. The boundaries of any such region are a combination of the amplitude boundaries associated with the data map and the radius from the origin of the I, Q axes to a given state point. Either all or part of that radius may be used in forming the boundary.

4. Fine Amplitude control map (AMPL CNTRL)—This map is always divided into two regions, the larger one of which is for increasing the amplitude and the smaller one of which is for decreasing the amplitude.

It should be appreciated that independent of the type of APK modulation scheme in use, there will appear at the output of the ROM, signals for controlling the operation of the demodulator. The signals will control the VCO frequency and phase and the fast amplitude variations of the I and Q channel signals into circuits 26I and 26Q. There will also appear at the output of the ROM, data. This data will consist of a multiplicity of bits, where the number of such bits is dependent on the APK modulation scheme being used. For 16-QAM modulation the number of data bits is four whereas for 8-PSK modulation the number of such bits is three.

It also should be appreciated that while the invention has been described in connection with a ROM having 4,096 eight (8) bit words that the number of bits making up a ROM word and the size of the ROM is dependent on the type of APK modulation being used and the map resolution desired. For 16-QAM modulation the ROM contains 32,768 bits. This 32K ROM allows the I and Q axes to be each divided into 64 steps. If it was desired to double the resolution, i.e. 128 steps per axis, then a 128K ROM would have to be used. If 32-QAM modulation is being used the number of data bits would be five and the total number of bits in each word would be nine. To have 64 steps per axis the ROM would have to be large enough to contain 36,864 bits. Therefore a 64K ROM would have to be used. To have 128 steps per axis a 256K ROM would have to be used.

It is to be understood that the description of the preferred embodiment is intended to be only illustrative, rather than exhaustive, of the present invention. Those of ordinary skill will be able to make certain additions, deletions, and/or modifications to the embodiments of the disclosed subject matter without departing from the spirit of the invention or its scope, as defined by the appended claims.

What is claimed is:

1. A demodulator for demodulating data from a received signal which comprises a carrier signal modulated, in accordance with a selected one of a multiplicity of amplitude and phase keyed modulation schemes, by input binary data having a clock associated therewith, said selected scheme giving rise to a multiplicity of signals representative to said input binary data, said demodulator demodulating said input binary data from said received signal by first capturing said received signal and then by maintaining capture when said received signal is captured, said demodulator comprising:

(a) storage means having stored therein a multiplicity of addressable words each containing information, said information providing at the output of said storage means when one of said words is addressed signals for controlling demodulation of said received signal and said data, said information being uniquely determined by said multiplicity of signals representative of said input binary data;
   (b) means responsive to said received signal for recovering said clock; and
   (c) loop means arranged to operate in a first mode for capturing said received signal and in a second mode for maintaining capture when said received signal is captured, said loop means responsive in both modes of operation to said received signal, said recovered clock and said demodulation control signals for generating a signal for addressing said words dependent upon said received signal, said demodulation control signals controlling which mode said loop means operates in.

2. The demodulator of claim 1 wherein said loop means includes:
   (i) means for generating a signal having a controllable frequency and phase, said demodulation control signals comprising first control signals and a fast amplitude variations compensating signal, said generating means responsive to said first control signals for controlling said phase and frequency; and
   (ii) means responsive to said received signal, said generating means generated signal, said fast amplitude variations compensating signal and said recovered clock for generating said addressing signal.

3. The demodulator of claim 2 wherein said means for generating said signal having a controllable frequency and phase includes:
   (i) means having a multiplicity of controllable bandwidths, said means responsive to said first control signals for generating a signal having one of said bandwidths for controlling said phase; and
   (ii) controllable oscillator means responsive to said controlled bandwidth signal for generating said controllable frequency and phase signal.

4. The demodulator of claim 3 wherein said controllable bandwidth means is an active low pass filter having first and second bandwidths, said first bandwidth being associated with said first mode and said second bandwidth being associated with said second mode.

5. The demodulator of claim 3 wherein said controllable oscillator means includes:
   (i) control means responsive to said controllable frequency and phase signal and said received signal for generating a frequency control signal; and
   (ii) oscillator means responsive to said frequency control signal and said controlled bandwidth signal for generating said controllable signal, said frequency control signal being connected to said oscillator means only in said first mode for causing said frequency to become substantially equal to said carrier signal frequency.

6. The demodulator of claim 5 wherein said oscillator means is a voltage controlled oscillator.

7. The demodulator of claim 1 wherein said information is contained in said addressable words in the form of a predetermined number of bits, said predetermined number being uniquely determined by said selected modulation scheme.

8. The demodulator of claim 7 wherein four of said predetermined number of bits are associated with said demodulation control signals and the remaining ones of said predetermined number being associated with said data.

9. A demodulator for demodulating data from a received signal which comprises a carrier signal modulated, in accordance with a selected one of a multiplicity of amplitude and phase keyed modulation schemes, by input binary data having a clock associated therewith, said selected scheme giving rise to a multiplicity of signals representative of said input binary data, said demodulator demodulating said input binary data from said received signal by first capturing said received signal and then by maintaining capture when said received signal is captured, said demodulator comprising:
   (a) storage means having stored therein a multiplicity of addressable words each containing information, said information providing at the output of said storage means when one of said words is addressed first demodulation control signals, a signal for compensating for fast variations in amplitude and said data, said information being uniquely determined by said multiplicity of signals representative to said input binary data;

(b) means responsive to said received signal for recovering said clock; and (c) loop means arranged to operate in a first mode for capturing said received signal and in a second mode for maintaining capture when said received signal is captured, said loop means including:

(i) means for generating a signal having a controllable frequency and phase, said means responsive in both modes of said loop means operation to said first demodulation control signals for controlling said phase and frequency and which of said modes said loop means operates in; and (ii) means responsive in both modes of said loop means operation to said received signal, said controllable frequency and phase means generated signal, said fast amplitude variations compensating signal and said recovered clock for generating said addressing signal.

10. The demodulator of claim 9 wherein said means for generating said signal having a controllable frequency and phase includes:

(i) means having a multiplicity of controllable bandwidths, said means responsive to said first demodulation control signals for generating a signal having one of said bandwidths for controlling said phase; and (ii) controllable oscillator means responsive to said controlled bandwidth signal for generating said controllable frequency and phase signal.

11. The demodulator of claim 10 wherein said controllable bandwidth means is an active low pass filter having first and second bandwidths, said first bandwidth being associated with said first mode and said second bandwidth being associated with said second mode.

12. The demodulator of claim 10 wherein said controllable oscillator means includes:

(i) control means responsive to said controllable frequency and phase signal and said received signal for generating a frequency control signal; and (ii) oscillator means responsive to said frequency control signal and said controlled bandwidth signal for generating said controllable signal, said frequency control signal being connected to said oscillator means only in said first mode for causing said frequency to become substantially equal to said carrier signal frequency.

13. The demodulator of claim 12 wherein said oscillator means is a voltage controlled oscillator.

14. The demodulator of claim 9 wherein said information is contained in said addressable words in the form of a predetermined number of bits, said predetermined number being uniquely determined by said selected modulation scheme.

15. The demodulator of claim 14 wherein one of said predetermined number of bits is associated with said information for providing said amplitude compensating signal, three of said bits are associated with said information for providing said first demodulation control signals and the remaining ones of said predetermined number being associated with said data.

16. The demodulator of claim 15 wherein said three bits includes one bit for controlling said bandwidth of said controlled bandwidth signal and two bits for controlling said phase of said controllable frequency and phase signal.

17. A demodulator for demodulating data from a received signal which comprises a carrier signal modulated, in accordance with a selected one of a multiplicity of amplitude and phase keyed modulation schemes, by input binary data having a clock associated therewith, said selected scheme giving rise to a multiplicity of signals representative of said input binary data, said demodulator demodulating said input binary data from said received signal by first capturing said received signal and then by maintaining capture when said received signal is captured, said demodulator comprising:

(a) compensation means responsive to said received signal and a first control signal for compensating for slow amplitude variations in said received signal and for generating first and second compensated signals;

(b) storage means having stored therein a multiplicity of addressable words each containing information, said information providing at the output of said storage means when one of said words is addressed signals for controlling demodulation of said received signal and said data, said information being uniquely determined by said multiplicity of signals representative of said input binary data;

(c) means responsive to said first compensated signal for generating said first control signal and for recovering from said compensated signal said clock; and (d) loop means arranged to operate in a first mode for capturing said received signal and in a second mode for maintaining capture when said received signal is captured, said loop means responsive in both modes of operation to said first and second compensated signals, said recovered clock and said demodulation control signals for generating a signal for addressing said words dependent upon said received signal, said demodulation control signals controlling which mode said loop means operates in.

18. The demodulator of claim 17 wherein said compensation means includes first means responsive to said first control signal for compensating for said slow variations, said first means generating a compensated received signal, and second means responsive to said compensated received signal for generating said first and second compensated signals.

19. The demodulator of claim 17 wherein said loop means includes:

(i) means for generating a signal having a controllable frequency and phase, said demodulation control signals comprising second control signals and a fast amplitude variations compensating signal, said means responsive to said second control signals for controlling said phase and frequency; and (ii) means responsive to said compensated signals, said generating means generated signal, said fast amplitude variations compensating signal and said recovered clock for generating said addressing signal.

20. The demodulator of claim 19 wherein said means for generating said signal having a controllable frequency, and phase includes:

(i) means having a multiplicity of controllable bandwidths, said means responsive to said second control signals for generating a signal having one of said bandwidths for controlling said phase; and (ii) controllable oscillator means responsive to said controlled bandwidth signal for generating said controllable frequency and phase signal.

21. The demodulator of claim 20 wherein said controllable bandwidth means is an active low pass filter having first and second bandwidths, said first bandwidth being associated with said first mode and said second bandwidth being associated with said second mode.

22. The demodulator of claim 20 wherein said controllable oscillator means includes:

(i) control means responsive to said controllable frequency and phase signal and said received signal for generating a frequency control signal; and (ii) oscillator means responsive to said frequency control signal and said controlled bandwidth signal for generating said controllable signal, said frequency control signal being connected to said oscillator means only in said first mode for causing said frequency to become substantially equal to said carrier signal frequency.

23. The demodulator of claim 19 wherein said loop means further includes first means responsive to said first and second compensated signals and said controllable frequency and phase signal for generating from said first compensated signal a first baseband signal and from said second compensated signal a second baseband signal, said second baseband signal being phase shifted ninety degrees with respect to the phase of said first baseband signal, second means responsive to said baseband signals and said fast amplitude compensating signal for generating first and second compensated baseband signals and third means responsive to said compensated baseband signals and said recovered clock for generating said addressing signal.

24. The demodulator of claim 17 wherein said information is contained in said addressable words in the form of a predetermined number of bits, said predetermined number being uniquely determined by said selected modulation scheme.

25. The demodulator of claim 24 wherein one of said predetermined number of bits is associated with said information for providing said compensating signal, three of said bits are associated with said information for providing said second control signals and the remaining ones of said predetermined number being associated with said data.

26. The demodulator of claim 25 wherein said three bits includes one bit for controlling said bandwidth of said controllable bandwidth signal and two bits for controlling said phase of said controllable frequency and phase signal.

27. A modulator - demodulator, said modulator giving rise to a signal for transmission which comprises a carrier signal modulated, in accordance with a selected one of a multiplicity of amplitude and phase keyed modulation schemes, by input binary data having a clock associated therewith, said selected scheme giving rise to a multiplicity of signals representative of said input binary data, said demodulator for demodulating said input binary data from a received signal which has been modulated in accordance with said selected scheme, said selected scheme giving rise to said multiplicity of signals representative of said input binary data, said received signal having a carrier signal and a clock associated therewith, (a) said modulator comprising:

(i) storage means having stored therein a multiplicity of addressable words arranged in two equal groups, each of said words containing information, said information being uniquely determined by said selected scheme and providing at the outputs of said storage means when a word from each of said groups is addressed a digital signal, said input binary data addressing said words;

(ii) oscillator means for generating a signal; and (iii) processing means responsive to at least said digital signal and said oscillator signal for generating said signals representative of said input binary data dependent upon said input binary data; and (b) said demodulator demodulating said input binary data from said received signal by first capturing said received signal and then by maintaining capture when said received signal is captured, said demodulator comprising:

(i) storage means having stored therein a multiplicity of addressable words each containing information, said information providing at the output of said storage means when one of said words is addressed signals for controlling demodulation of said received signal and said received data, said information being uniquely determined by said multiplicity of signals representative of said input binary data;

(ii) means responsive to said received signal for recovering said clock; and (iii) loop means arranged to operate in a first mode for capturing said received signal and in a second mode for maintaining capture when said received signal is captured, said loop means responsive in both modes of operation to said received signal, said recovered clock and said demodulation control signals for generating a signal for addressing said words dependent upon said received signal, said demodulation control signals controlling which of said modes said loop means operates in.

* * * * *